United States Patent [19]

Wada

[11] Patent Number: 4,464,017
[45] Date of Patent: Aug. 7, 1984

[54] REMOTELY CONTROLLED MIRROR APPARATUS FOR MOTOR VEHICLES

[75] Inventor: Yasuto Wada, Machida, Japan

[73] Assignee: Ichikoh Industries Limited, Tokyo, Japan

[21] Appl. No.: 363,222

[22] Filed: Mar. 29, 1982

[30] Foreign Application Priority Data

Aug. 31, 1981 [JP] Japan .............................. 56-127802[U]
Sep. 7, 1981 [JP] Japan .............................. 56-131988[U]

[51] Int. Cl.³ .................................................. G02B 7/18
[52] U.S. Cl. ....................................... 350/307; 248/900
[58] Field of Search ................. 350/307, 288; 248/900

[56] References Cited

FOREIGN PATENT DOCUMENTS

| 2436339 | 2/1976 | Fed. Rep. of Germany ...... 350/307 |
| 2721004 | 11/1978 | Fed. Rep. of Germany ...... 350/307 |
| 2754377 | 6/1979 | Fed. Rep. of Germany ...... 350/288 |
| 2186905 | 1/1974 | France ................................ 350/307 |

Primary Examiner—Jon W. Henry
Attorney, Agent, or Firm—Cushman, Darby & Cushman

[57] ABSTRACT

A remotely controlled mirror apparatus having a shock absorbing mechanism and the control mechanism, wherein even when a mirror housing is applied with strong external force thereby to be inclined or fallen, the mirror follows the inclination of the mirror housing for preventing damage to the mirror and further the mirror housing can be positively returned to its initial or normal position.

6 Claims, 8 Drawing Figures

REMOTELY CONTROLLED MIRROR APPARATUS FOR MOTOR VEHICLES

BACKGROUND OF THE INVENTION (a) Field of the Invention

The present invention relates to a remotely controlled mirror apparatus for motor vehicles, more particularly to a remotely controlled outside mirror apparatus in which a mirror can be controlled from the interior of a motor vehicle, and also a shock absorbing mechanism is provided to increase safety by absorbing a strong shock due to an external force applied to the housing supporting the mirror.

(b) Description of the Prior Art

A conventional remotely controlled mirror apparatus provided with a shock absorbing mechanism is widely used as a rear view mirror apparatus mounted on a body of a vehicle in such a manner that the remotely controlled mirror apparatus is projected exteriorly from the body of the motor vehicle. The remotely controlled mirror apparatus has functions for reducing damage by an external object and for preventing damage to the mirror per se by the operation that the mirror housing inclines and falls with respect to the body of the vehicle, when the housing comes into collision with an external object. Such functions are achieved by the construction that the mirror housing is resiliently held by a spring with respect to a base fixed on the body of the vehicle. According to such construction the mirror housing can incline and fall in a forward or backward direction in accordance with the direction of the external force to absorb the strong shock resulting from the application of the external force to the mirror housing. A control mechanism for adjusting the inclination of the mirror body securing the mirror is composed of a handling lever, a movable plate connected to the handling lever through a hinge mechanism, and a fitting portion disposed on the mirror body to slidably fit the movable plate; the handling lever being integrally formed with a knob disposed in the interior of the motor vehicle, a pivot rotatably supported on the base, and an arm connected to the movable plate.

In such a conventional remotely controlled mirror apparatus mentioned above, the inclination of the mirror body securing the mirror is adjusted in such a manner that the arm is rotated around the pivot by shifting the knob and the movable plate connected to the handling lever through the hinge slides to push the internal wall of the fitting portion. According to such conventional construction, in the case where the mirror housing is inclined with respect to the base in a forward or backward direction by the application of an external force, the distance between the mirror body and the handling lever is changed by a sliding motion of the movable plate with respect to the mirror body. As a result, the mirror body follows the inclination of the mirror housing thereby preventing the damage to the mirror body and/or the handling lever.

However, according to such conventional construction there is provided the fitting portion for slidably fitting the movable plate to the mirror body so as to rotate the mirror body with respect to the mirror housing and to make the movable plate movable by the shifting operation of the handling lever. The predetermined relationship in position between the mirror body and the movable plate is undesirably shifted, however, by vibration of the motor vehicle which results in an unclear field of view and deterioration of operation efficiency. Further there is provided no means for regulating the sliding distance of the movable plate with respect to the fitting portion in the construction mentioned above, so that the movable plate undesirably escapes from the fitting portion and a normal return of the mirror body is undesirably disturbed by interference produced between the mirror body and the handling lever, when the mirror body has completely fallen down on the base for supporting the mirror body.

SUMMARY OF THE INVENTION

The object of the present invention is to provide a remotely controlled mirror apparatus of the shock absorbing type in which a mirror can follow the inclination of a mirror housing even when the mirror housing has inclined and fallen down by an external force and further there is provided a control mechanism for positively returning or recovering the mirror housing to its initial or normal position from the inclined and fallen position.

Another object of the present invention is to provide a remotely controlled mirror apparatus of the shock absorbing type comprising a mirror, a mirror body for securing the mirror, a mirror housing supporting the mirror body such that the mirror body can be adjustably moved or inclined within the mirror housing, a base member for supporting the mirror housing on the body of a motor vehicle, a spring means disposed between the mirror housing and the base member for resiliently holding the mirror housing on the base member, a connecting means for rotatably connecting the mirror housing with the base member, and a control mechanism for adjusting or inclining the mirror body with respect to the mirror housing in a remote control fashion, wherein the control mechanism is composed of a first link rotatably mounted on the mirror body and a second link rotatably mounted on the base member and rotatably connected with the first link, the rotation center of the second link being remote from the rotation center of the first link, and a stopper is provided on the first link to restrict the rotation angle of the second link in such a manner that when the first link is rotated by a predetermined rotation angle, the stopper is contacted or hit by a portion of the mirror body.

DETAILED DESCRIPTION OF THE PREFERRED EMBODIMENT

Figure 1:
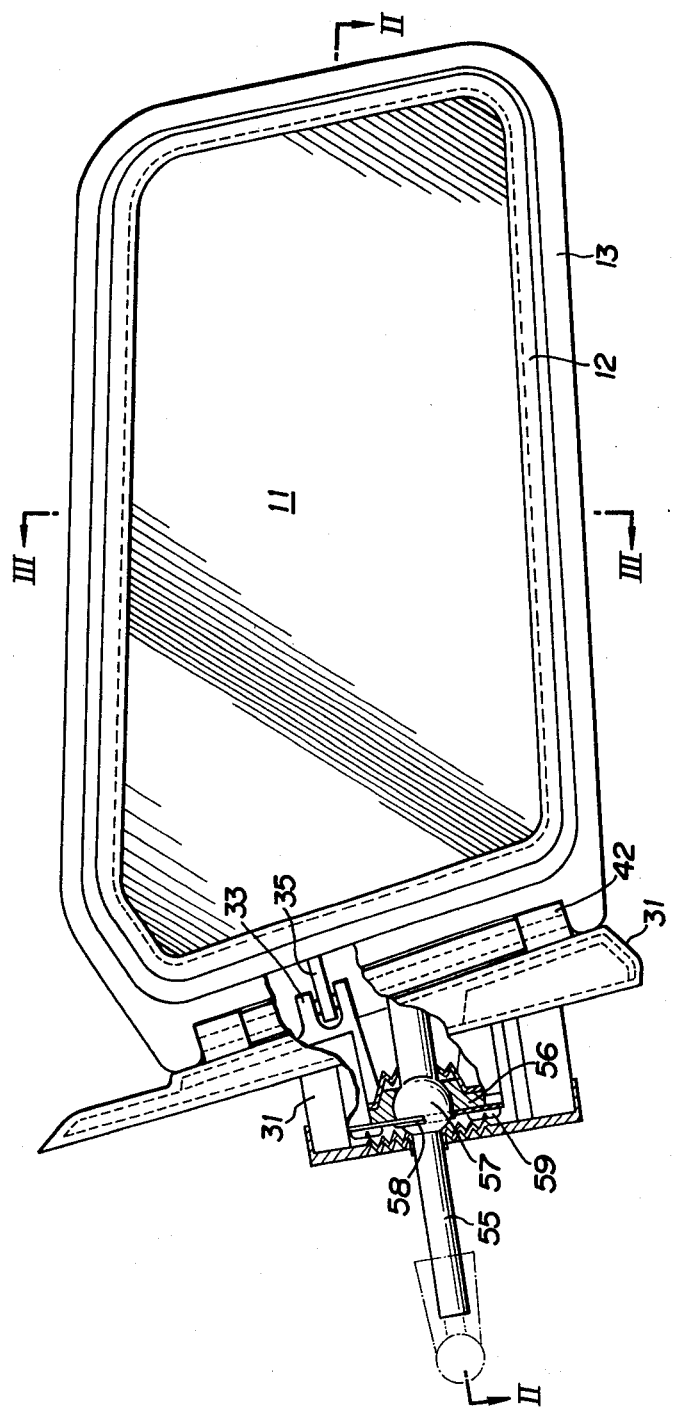
FIG. 1 is a partially cut-away and sectionalized front view of a remotely controlled mirror apparatus embodying the present invention.
Figure 2:
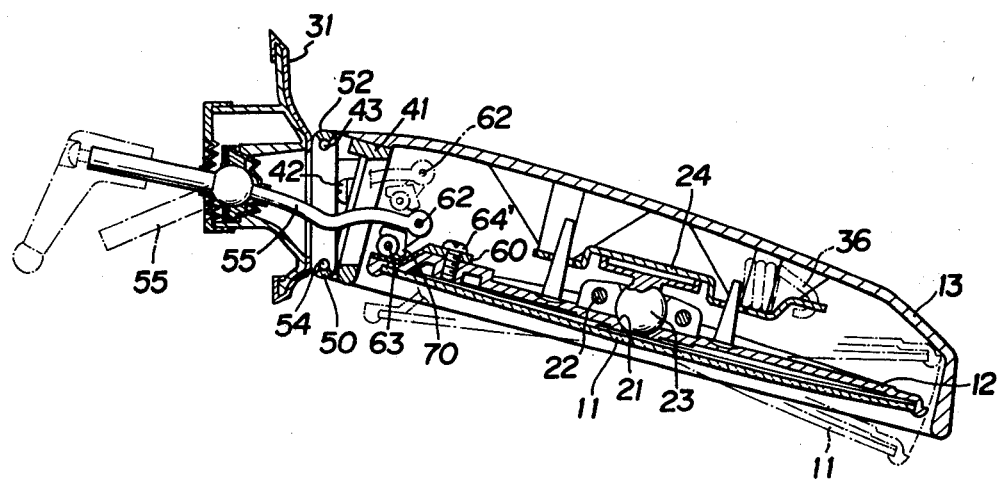
FIG. 2 is a sectional view in reduced scale, taken along the line II—II of FIG. 1.

Referring to FIG. 1, there is shown an embodiment of the remotely controlled mirror apparatus of the present invention applied to an exterior door mirror of a motor vehicle. In FIG. 1, numeral 11 designates a mirror, 12 a mirror body holding the mirror 11, 13 a mirror housing receiving the mirror body 12. The mirror body 12 holds the peripheral portion of the mirror 11, and the mirror body 12 is disposed at the portion adjacent to the opening of the mirror housing 13 such that the reflecting surface of the mirror 11 becomes a front surface. A socket 21 adapted to receive a ball 23 is integrally formed with the mirror body 12 at the center portion of the surface of the mirror body 12 opposite to the mirror 11. The mirror body 12 is preferably made of synthetic resin and divided into two parts, which include the socket 21 as shown in FIG. 2, which can be fastened together by a screw 22. A ball 23 secured to the mirror housing 13 is fitted to the socket 21. Torque required for the operation of the ball-socket joint is adjustable by controlling the screw 22.

Figure 3:
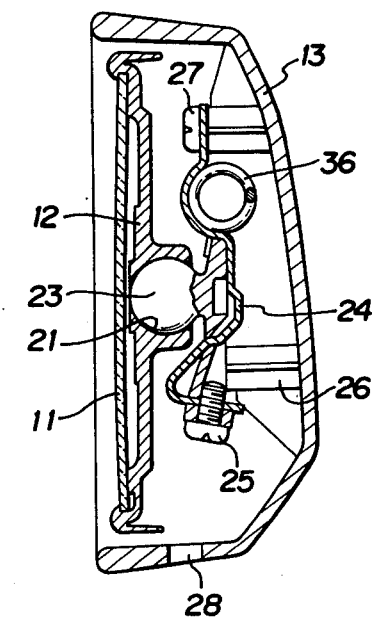
FIG. 3 is a sectional view taken along the line III—III of FIG. 1.

As shown in FIG. 3, the ball 23 is secured to a supporting plate 24 fixed on the bottom wall of the mirror housing 13 by a screw 25. The supporting plate 24 is secured by a screw 27 to a supporting portion 26 integrally formed with the bottom wall of the mirror housing. The screw 25 can be inserted through a through hole 28 provided through the lower portion of the mirror housing 13 in order to fix the ball 23 to the supporting plate 24. The diameter of the through hole 28 is slightly larger than that of the screw 25 for commonly using the through hole 28 as a hole for draining water.

Thus the ball 23 secured to the mirror housing 13 can be fitted to the socket 21 provided on the mirror body 12, and the torque of the ball-socket joint can be adjusted by controlling the screw 22, so that the mirror can be rotatable around the socket 21 and moved or inclined in upward, downward, left and right directions.

Figure 4:
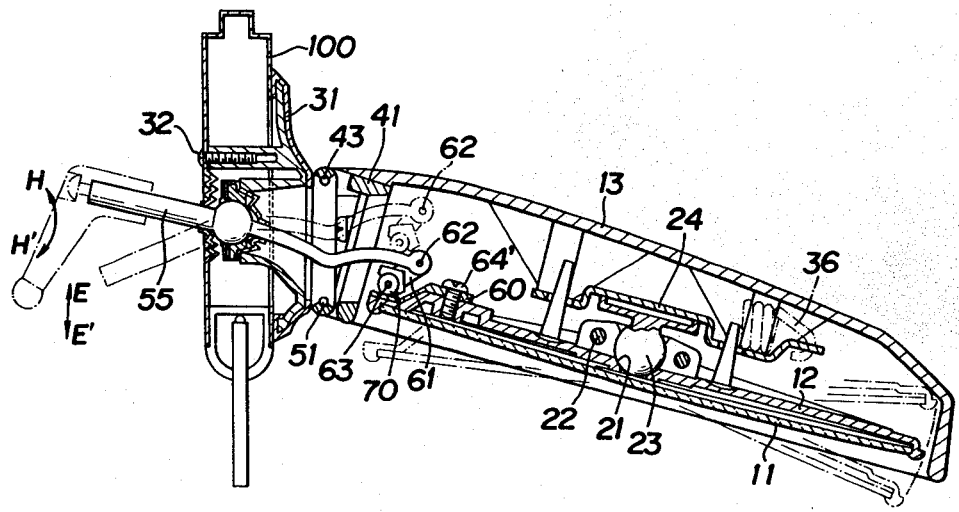
FIG. 4 is a sectional view similar to FIG. 2 of the remotely controlled mirror apparatus mounted on a body of a vehicle.

Referring now to FIG. 4, numeral 31 designates a base member for supporting the whole of the mirror housing 13 as mentioned above. The base member 31, as shown in FIG. 4, is fixed by using a mounting member 32 at a portion of a vehicle door 100 on the driver seat side adjacent to the windshield. All of the base member 31 is formed by die casting and the portions of the base member 31 to be contacted to the door and the mirror housing 13 are covered by synthetic rubber to protect those portions.

Figure 5:
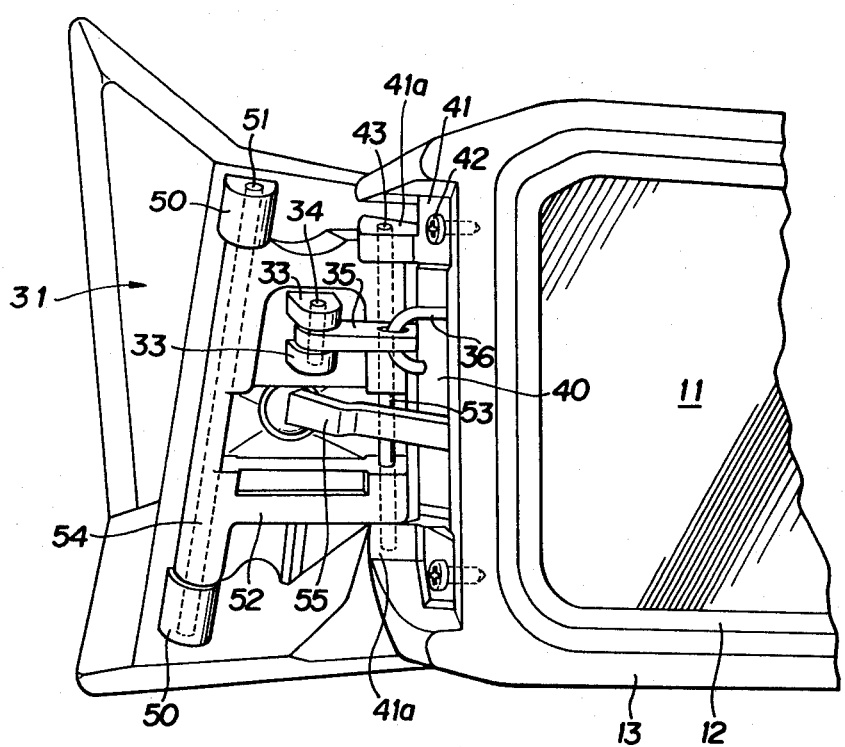
FIG. 5 is a perspective view showing the connection between the mirror housing and a base member of the remotely controlled mirror apparatus.

Referring now to FIG. 5, a connection relationship between the mirror housing and the base member is explained. Numerals 33 and 33 designate a pair of projections integrally formed with the base member 31 by die casting, and numeral 34 designates a pin bridged between the projections 33 and 33. Numeral 35 designates a connecting member one end of which is rotatably mounted to the pin 34 and the other end of which is hooked to one end of a coil spring 36. The other end of the coil spring 36 is hooked to the supporting plate 24 (FIG. 2) fixed to the mirror housing 13, thereby to resiliently hold the whole of the mirror housing 13 with respect to the base member 31 by the resilient force of the coil spring 36. A rectangular opening 40 is formed at one end portion of the mirror housing 13 adjacent to the base member 31, and remote control means for controlling the mirror 11 to be mentioned hereinafter and the coil spring 36 pass through the opening 40 to be connected to the base member 31. Further there is provided connecting means for connecting the mirror housing 13 to the base member 31 so that the mirror housing 13 can be inclined and fallen with respect to the base member 31.

The connecting means composes a shock absorbing mechanism for preventing the mirror housing 13 and the mirror 11 from damage due to the external force to be applied to them by a inclining motion of the mirror housing 13 with respect to the base member 31 in accordance with both magnitude and direction of the external force upon application of the external force to the mirror housing 13. The arrangement and operation of the connecting means will be explained in more detail hereinafter.

A connecting member 41 for connecting the mirror housing 13 with the base member 31 is fixed on the peripheral portions of opening 40 by screws 42. Connecting member 41 has spaced projections 41a, 41a having aligned through holes 43, and the line connecting the through holes 43 lies on one side of the rectangle formed by the opening 40.

On the other hand, the base member 31 has a pair of spaced protrusions 50 and 50 having aligned through holes 51 and 51. The line connecting the holes 51 and 51 lies on the other side of the above rectangle when the end portion of the mirror housing 13 is contacted or hit to the base member 31 by the resilient force of the coil spring 36. A rectangular connecting frame 52 having an opening at the central portion thereof is disposed between the projections 41a and 41a and the protrusions 50 and 50, and one vertical side of the connecting frame 52 is positioned between the projections 41a, 41a and the connecting frame 52 is rotatable around a pin 53 inserted into the through holes 43. The other vertical side of the connecting frame 52 is positioned between the protrusions 50 and 50 and the connecting frame 52 is rotatable around a pin 54 inserted into the through holes 51. The central opening of the connecting frame 52 is formed so as to pass therethrough the remote control means for inclining the mirror and the connecting member 35.

As stated above the connecting frame 52 for connecting the base member 31 and the mirror housing 13 is rotatable around the pin 54 fixed on the base member 31 as well as the pin 53 fixed on the mirror housing 13.

According to the above arrangements of the connecting means, when the mirror housing 13 is urged to the base member 31 by the resilient force of the coil spring 36, the connecting frame 52 is positioned between the mirror housing 13 and the base member 31, and when an external force is applied to the front surface or reflecting surface side of the mirror housing 13, the mirror housing 13 yields to the external force thereby to rotate around the pin 53 against the resilient force of the coil spring 36, and on the other hand when the external force is applied to the back surface of the mirror housing 13, the mirror housing 13 can be reversely rotated around the pin 54 without changing the relationship in position between the mirror housing 13 and the connecting frame 52. When the external force is removed from the mirror housing 13, the resilient force of the coil spring 36 returns the mirror housing 13 to an initial or normal position with respect to the base member 31.

According to the remotely controlled mirror apparatus of the present invention, there are provided the above-mentioned shock absorbing mechanism and remote control means due to link mechanism for inclining the mirror, the arrangements and operation will be described in detail hereinafter.

Figure 6:
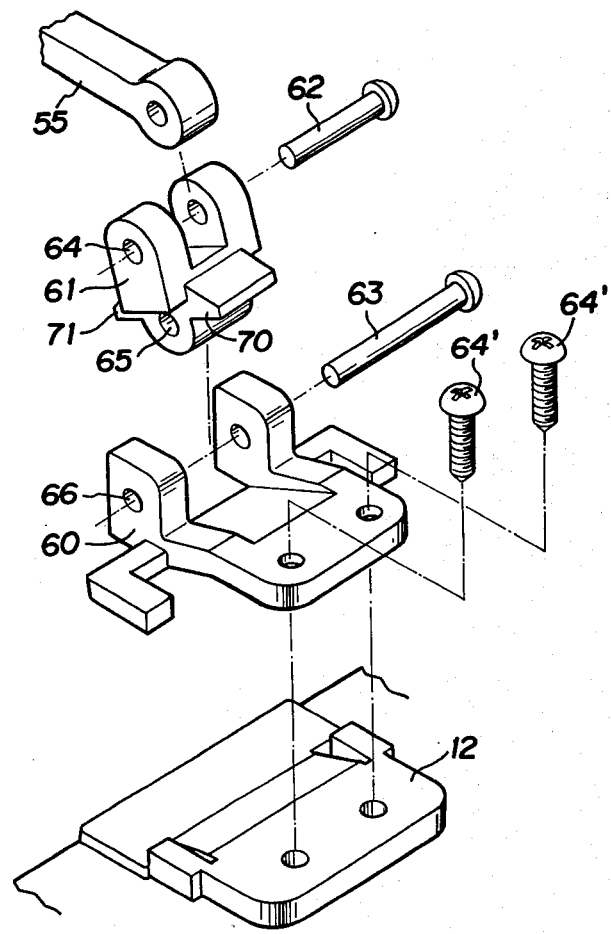
FIG. 6 is an exploded view showing the rotation between the handling link, the link and the supporting members of the remotely controlled mirror apparatus.

Referring now to FIG. 6, the remote control means is composed of a handling link 55 rotatably mounted on the base member 31, a supporting member 60 secured on the mirror body 12, and a link 61 for connecting the handling link 55 and the supporting member 60.

Figure 7:
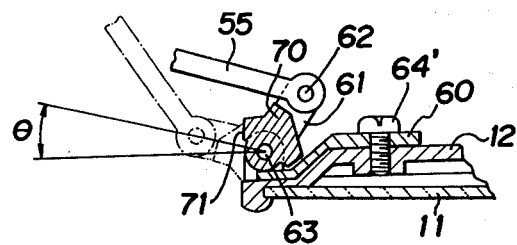
FIG. 7 is the sectional view showing operation of a stopper mounted on the link of the remotely controlled mirror apparatus.

As shown in FIG. 1, a socket 56 (FIG. 1) is mounted on the base member 31 for rotatably receiving the ball 57 comprising a portion of the handling link 55. The ball 57 is fastened to the base member 31 by a screw 59 through a pressing plate 58 as shown in FIG. 1. Torque required for operation of the ball-socket joint can be adjusted by controlling the screw 59. The one end of the handling link 55 is extended into the interior of the motor vehicle, and provided with a knob for handling the handling link 55, shown by an imaginary line. Further the other end of the handling link 55 is extended into the mirror housing 13 through the opening 40. As shown in FIG. 6, the handling link 55 is rotatably connected to a link 61 by a pin 62, and the link 61 is rotatably connected to the supporting member 60 by a pin 63, and the supporting member 60 is fixed on the portion of the mirror body 12. The link 61 has a pair of projections parallel with each other having aligned through holes 64 as shown in FIG. 6. The other end of the handling link 55 is positionable in the space formed between the projections having the through holes 64 and pivoted around the pin 62 thereby to become rotatable with respect to the link 61. The link 61 has a through hole 65 and the axis of which is parallel to the line connecting the through holes 64. The end portion including the hole 65 of the link 61 is positionable in a space formed between two parallel projections having aligned through holes 66 and pivoted around the pin 63 thereby to become rotatable with respect to the supporting member 60. As shown in FIGS. 2 and 7, the supporting member 60 is detachably secured by screws 64' to the surface opposite to the surface provided with the mirror 11 of the mirror body 12. To detachably secure the supporting member 60 to the mirror body 12 has the meritorious effect that in the case where the mirror 11 is damaged, the supporting member 60 can be easily removed from the mirror body 12 in order to exchange the mirror body including the damaged mirror for a new mirror body having a new mirror, without using any special tool and any additional manufacturing.

As mentioned above, the mirror body 12 can be inclined or adjustable by two links 55 and 61 rotatable with each other, and a stopper 70 is provided on the link 61 to restrict the rotational angle of the handling link 55. The stopper 70 is formed on a portion of the link 61 adjacent to the supporting member 60, and the configuration of the stopper 70 is made such that the line connecting two pivots or rotation centers i.e. the through holes 64 and 65 is usually located in the mirror housing side with respect to the line connecting the through hole 66 and the pivot of the mirror body i.e. the center of the ball 23. As shown in FIGS. 6 and 7, the stopper 70 has an approximate pentagonal shape the center of which is conformed with the through hole 65 i.e. the pin 63, thereby to restrictly stop the rotational movement of the link 61 by the end portion 71 of the stopper 70.

Figure 8:
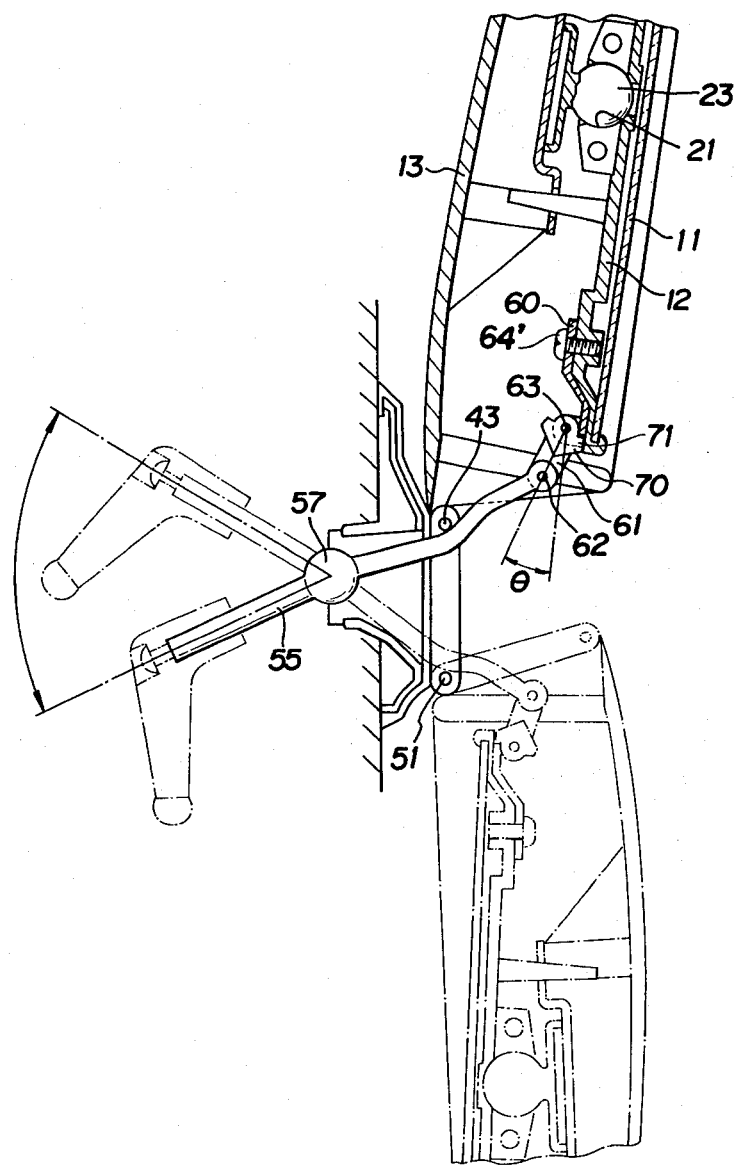
FIG. 8 is a sectional view showing the rotation range of the link due to an inclination of the mirror housing of the remotely controlled mirror apparatus.

By stopping the rotational movement of the link 61, the handling link 55 also is restricted in the rotation angle thereof. In the state shown in FIG. 4 wherein the mirror housing 13 is resiliently held on the base member 31 by the coil spring 36, the rotation center 63 for connecting the link 61 to the supporting member 60 out of two rotation centers 62 and 63 of the link 61 is positioned in the base member side with respect to the rotation center 62 for connecting the link 61 to the handling link 55, and the handling link 55, link 61 and the mirror body 12 are disposed so as to form an approximate Z-shaped configuration. When the mirror housing 13 is applied with a strong external force at the front surface of the mirror housing 13 thereby inclined with respect to the base member 31, the link 61 is rotated around the pin 62 and in accordance with the change of the distance between the mirror housing 12 and the end portion of the link 55, the end portion 71 of the stopper 70 is contacted with the end portion of the mirror body 12 thereby to prevent further movement of the handling link 55, when the angle formed by the line connecting the pin 62 and the pin 63 and the line connecting the pin 63 and the center of the ball 23 becomes $\theta$, as shown in FIG. 8. At that time, the connection point of the handling link 55 and the link 61 is not projected outwardly from the mirror housing 13, so that when the external force is removed the mirror housing 13 can be positively returned to an initial or normal position.

Referring now to an operation for the adjusting mirror angle of the remotely controlled mirror apparatus of the present invention, at first, if an operator wishes to move the mirror 11 in the vertical direction i.e. the direction perpendicular to the surface of the paper sheet of FIG. 4, the operator can move the knob mounted at the end portion of the handling link 55 in the direction E-E'. By such the movement of the knob, the moving force is transmitted to the mirror body 12 rotatably supported by the ball 23 through the links 55 and 61, thereby to move the mirror 11. Next, if the operator wishes to move the mirror in the horizontal direction i.e. the direction parallel to the surface of the paper sheet of FIG. 4, the operator may move the knob in the direction H-H'. By the movement of the knob, the moving force is directly applied to the mirror body 12 to move it.

Thus the mirror is moved or inclined by two links 55 and 61, so that an unclear field of view due to mirror's vibration and an operational error are eliminated.

What is claimed is:

1. A remotely controlled mirror apparatus for motor vehicles comprising: a mirror, a mirror body for holding said mirror, a mirror housing supporting said mirror body so that said mirror body can be adjustably moved or inclined within said mirror housing, a base member for supporting said mirror housing on the body of a motor vehicle, spring means disposed between said mirror housing and said base member for resiliently holding said mirror housing on said base member, connecting means for rotatably connecting said mirror housing with said base member and a control mechanism for adjusting or inclining said mirror body with respect to said mirror housing in a remote control fashion, said control mechanism comprising a first link rotatably mounted on said mirror body, a second link rotatably mounted on said base member and rotatably connected with said first link, the rotation center of said second link with respect to said base member being remote from the rotation center of said first link with respect to said mirror body, and a stopper on said first link to restrict the rotation angle of said second link relative to said base member in such a manner that when said first link is rotatated through a predetermined rotation angle relative to said mirror body, said stopper contacts a portion of said mirror body.

2. A remotely controlled mirror apparatus according to claim 1, wherein said control mechanism further comprises a supporting member detachably secured to said mirror body and rotatably connected to said first link.

3. A remotely controlled mirror apparatus according to claim 1 or 2, wherein said stopper is formed in such a manner that the line connecting the two rotation centers is located in the mirror housing side with respect to the line connecting the moving center of said mirror body and the rotation center of said first link located in the mirror body side.

4. A remotely controlled mirror apparatus according to claim 1 or 2, wherein said stopper is formed coaxial with the rotation center of said first link located in the mirror body side.

5. A remotely controlled mirror apparatus according to claim 2, wherein said supporting member is secured to said mirror body on the side thereof opposite said mirror by means of screws.

6. A remotely controlled mirror apparatus according to claim 3, wherein said stopper is formed coaxially with the rotational center of said first link located in the mirror body side.

* * * * *